United States Patent
Harrington et al.

(10) Patent No.: US 7,615,135 B2
(45) Date of Patent: Nov. 10, 2009

(54) RETENTION AND DRAINAGE AIDS

(75) Inventors: John C. Harrington, Jacksonville, FL (US); Martha G. Hollomon, Newark, DE (US)

(73) Assignee: Hercules Incorporated, Wilmington, DE (US)

( * ) Notice: Subject to any disclaimer, the term of this patent is extended or adjusted under 35 U.S.C. 154(b) by 678 days.

(21) Appl. No.: 11/301,804

(22) Filed: Dec. 13, 2005

(65) Prior Publication Data

US 2006/0185806 A1 Aug. 24, 2006

Related U.S. Application Data

(60) Provisional application No. 60/636,448, filed on Dec. 14, 2004.

(51) Int. Cl.
*D21H 17/34* (2006.01)
*C08L 1/02* (2006.01)
*C08L 41/00* (2006.01)

(52) U.S. Cl. .................. 162/164.5; 524/13; 524/547

(58) Field of Classification Search ............ 162/164.5; 524/13, 32, 547
See application file for complete search history.

(56) References Cited

U.S. PATENT DOCUMENTS 3,284,393 A 11/1966 Vanderhoff et al. ......... 260/29.6
3,734,873 A 5/1973 Anderson et al. .......... 260/29.6
RE28,474 E 7/1975 Anderson et al. ........... 523/336
RE28,576 E 10/1975 Anderson et al. ........... 523/336
4,147,681 A 4/1979 Lim et al. .................. 260/29.6
4,426,482 A 1/1984 Kuramoto et al. ........... 524/460
4,970,260 A 11/1990 Lundberg et al. ........... 524/516
5,098,520 A 3/1992 Begala ..................... 162/168.1
5,167,766 A 12/1992 Honig et al. .............. 162/164.1
5,171,808 A 12/1992 Ryles et al. ................. 526/264
5,185,062 A 2/1993 Begala ..................... 162/168.1
5,290,479 A 3/1994 Clark ......................... 252/351
5,958,188 A 9/1999 Heard et al. .............. 162/168.2
6,310,157 B1 10/2001 Heard et al. ................ 526/240
6,573,336 B1 6/2003 Inagaki et al. ............ 525/333.5
7,250,448 B2 * 7/2007 Walchuk et al. ............... 516/20
2005/0143543 A1 6/2005 Spindler et al. ............. 526/287

FOREIGN PATENT DOCUMENTS

EP  0 497 030     11/1994
GB  1168551       10/1969
WO  WO/03 085013  10/2003

* cited by examiner

*Primary Examiner*—Fred M Teskin
(74) *Attorney, Agent, or Firm*—Joanne Mary Fobare Rossi

(57) ABSTRACT

The present invention describes polymeric retention and drainage aids for cellulosic fiber compositions and methods of use of the same.

20 Claims, No Drawings

RETENTION AND DRAINAGE AIDS

CROSS REFERENCE TO RELATED APPLICATIONS

This application claims the benefit of U.S. Provisional Application No. 60/636,448, filed Dec. 14, 2004, the entire contents of which is herein incorporated by reference.

FIELD OF THE INVENTION

The present invention relates generally to cellulosic fiber compositions, and particularly to polymeric retention and drainage aids.

BACKGROUND OF THE INVENTION

Making cellulosic fiber sheets, particularly paper and paperboard, includes producing an aqueous slurry of cellulosic fiber, depositing this slurry on a moving papermaking wire or fabric, and forming a sheet from the solid components of the slurry by draining the water. The slurry may also contain inorganic mineral extenders or pigments. Likewise, organic and inorganic chemicals are often added to the slurry prior to the sheet-forming step to make the papermaking method less costly, more rapid, and/or to attain specific properties in the final paper product. After drainage, the sheet is pressed and dried to further remove water.

The paper industry continuously strives to improve paper quality, increase productivity, and reduce manufacturing costs. Chemicals are often added to the fibrous slurry before it reaches the papermaking wire or fabric, to improve the method drainage/dewatering and solids retention. Such chemicals are called retention and/or drainage aids. Drainage or dewatering of the fibrous slurry on the papermaking wire or fabric is often the limiting step in achieving faster method speeds. Improved dewatering can also result in a dryer sheet in the press and dryer sections, thus requiring less energy. Also, this stage in the papermaking method determines many sheet final properties.

Regarding solids retention, papermaking retention aids are used to increase the retention of fine furnish solids in the web during the turbulent method of draining and forming the paper web. Without adequate retention of the fine solids, they are either lost to the method effluent or accumulate to high levels in the recirculating white water loop, potentially causing deposit buildup. Additionally, insufficient retention increases the papermakers' cost due to loss of additives intended to be adsorbed on the fiber to provide the respective paper opacity, strength, or sizing property.

It is desirable to develop new retention and drainage aids. The present invention is directed to these, as well as other important ends.

BRIEF SUMMARY OF THE INVENTION

In one embodiment, the present invention includes water-compatible (water-soluble or water-dispersible) polymers comprising a polymer segment formed from at least one ethylenically unsaturated monomer (A) substituted with at least one aryl group and at least one —S(=O)$_2$OR$_1$ or —OS(=O)$_2$(O)$_p$R$_1$ moiety, wherein p is 0 or 1, R$_1$ is, independently at each occurrence, H, alkyl, aryl, or a cation, and the polymer has a weight average molecular weight of about 5 million or greater. Preferably, such polymers are anionic.

Such water-compatible polymers provide remarkable retention and drainage activity in cellulosic fiber compositions.

In another embodiment, the present invention includes such water-compatible polymers and cellulose fiber.

DETAILED DESCRIPTION OF THE INVENTION

In one embodiment, the present invention includes a water-compatible polymer, comprising a polymer segment formed from at least one ethylenically unsaturated monomer (A) substituted with at least one aryl group and at least one —S(=O)$_2$OR$_1$ or —OS(=O)$_2$(O)$_p$R$_1$ moiety, wherein p is 0 or 1, R$_1$ is, independently at each occurrence, H, alkyl, aryl, or a cation, and the polymer has a weight average molecular weight of about 5 million or greater. In some preferred embodiments, the water-compatible polymer is anionic. Examples of acceptable cations include Na$^+$, K$^+$, Li$^+$, NH$_4^+$, or alkyl-NH$_3^+$, but preferably the cation is sodium or ammonium.

It is understood that the requirement that A is substituted with at least one aryl group and at least one —S(=O)$_2$OR$_1$ or —OS(=O)$_2$(O)$_p$R$_1$ moiety is not meant to imply that the ethylene moiety must be directly substituted with both the aryl and —S(=O)$_2$OR$_1$ or —OS(=O)$_2$(O)$_p$R$_1$ moiety (see, e.g., Formula IA below). Such an arrangement is a part of the present invention, however A is also intended to include embodiments where the aryl is attached to the ethylene moiety, and the —S(=O)$_2$OR$_1$ or —OS(=O)$_2$(O)$_p$R$_1$ moiety is attached to the aryl (see, e.g., Formula I below). Likewise, the requirement of the presence of an aryl group can be satisfied by embodiments where R$_1$ is aryl (see, e.g., Formula IB below).

Examples of monomer A include, but are not limited to, the free acids or salts of: styrenesulfonic acid, vinyltoluenesulfonic acid, α-methyl styrenesulfonic acid, anetholesulfonic acid, vinylphenylsulfuric acid, 4-sulfonate N-benzyl acrylamide, 4-sulfonate N-phenyl acrylamide, vinylpyrenesulfonic acid, vinylanthracenesulfonic acid, or vinylpyridiniopropane sulfonate, and mixtures thereof.

In a preferred embodiment, the monomer A is a free acid or salt of the foregoing compounds. In a further embodiment, A has Formula I:

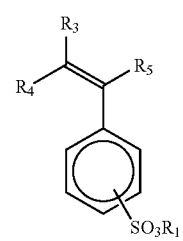

I wherein:

R$_1$ is a cation such as Na$^+$, K$^+$, Li$^+$, NH$_4^+$, or R$_5$NH$_3^+$; and R$_3$, R$_4$, and R$_5$ are, independently, H or alkyl. In formula I, the —SO$_3$R$_1$ groups can be in the ortho, meta or para position.

In some embodiments, the monomer A comprises a salt of styrenesulfonic acid. Preferably, the salt is sodium or ammonium salt.

Alternatively, a further embodiment, A has Formula IA or IB:

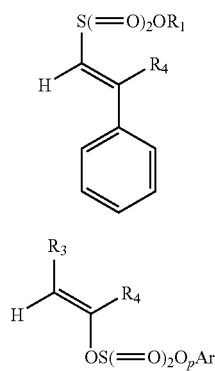

IA

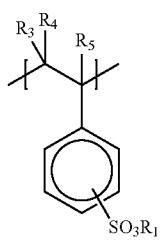

IB wherein:

$R_1$ is a cation such as $Na^+$, $K^+$, $Li^+$, $NH_4^+$, or $R_5NH_3^+$; and $R_3$, and $R_4$, are, independently, H or alkyl, and Ar is aryl.

It can readily be appreciated that polymers of the present invention can be homopolymers, i.e., entirely comprised of polymer segments formed from ethylenically unsaturated monomer A. A preferred homopolymer includes polymeric segments having Formula II:

II

[structure showing $R_3$, $R_4$, $R_5$ substituents with phenyl ring bearing $SO_3R_1$]

wherein:

$R_1$ is a cation such as $Na^+$, $K^+$, $Li^+$, $NH_4^+$, or $R_5NH_3^+$; and $R_3$, $R_4$, and $R_5$ are, independently, H or alkyl. In formula II, the —$SO_3R_1$ groups can be in the ortho, meta or para position In some preferred embodiments, $R_1$ is $Na^+$. In another embodiment, the present invention encompasses copolymers including polymer segments of differing monomers A, as described herein.

In another embodiment, the present invention also encompasses copolymers including polymer segments of monomer A and a polymer segment formed from at least one ethylenically unsaturated anionic or nonionic monomer (B). It is understood that the term copolymer is not meant to be limiting, and includes all possible monomer sequences involving A and B, including random, block, and alternating sequences.

Examples of monomer B include, but are not limited to, acrylamide, methacrylamide, N-alkylacrylamide, N-methylacrylamide, N,N-dialkyl acrylamide, N,N-dimethylacrylamide, acrylonitrile, N-vinyl methylacetamide, N-vinyl formamide, N-vinyl methyl formamide, N-vinyl pyrrolidone, styrene, butadiene, vinyl acetate, methyl acrylate, methyl methacrylate, alkyl acrylate, alkyl methacrylate, alkyl acrylamide, alkyl methacrylamide, alkoxylated acrylate, methacrylate, alkyl polyethyleneglycol acrylate, alkyl polyethyleneglycol methacrylate; the free acid of salt of: (meth) acrylic acid, maleic acid, fumaric acid, itaconic acid, acrylamidoglycolic acid, or mixtures thereof. While any anionic or nonionic monomer that allows the polymer to remain water-compatible is contemplated, preferably, the monomer B is acrylamide, acrylic acid or a salt of acrylic acid. Examples of acceptable salts include those having $Na^+$, $K^+$, $Li^+$, $NH_4^+$, or $R_5NH_3^+$, but preferably the salt is a sodium or ammonium salt.

In one embodiment, the molar ratio of A:B is from about 5:95 to about 100:0. In another embodiment, the molar ratio of A:B is from about 20:80 to about 100:0. In another embodiment, the molar ratio of A:B is from about 30:70 to about 100:0.

One preferred embodiment includes copolymers where the monomer A comprises a sodium or ammonium salt of styrenesulfonic acid and the monomer B is acrylamide. A preferred polymer of such embodiments includes polymeric segments having Formula II and Formula III, respectively:

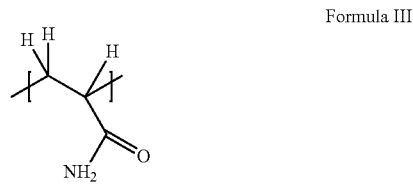

Formula III

In some preferred embodiments, $R_1$ is $Na^+$. Another preferred embodiment includes copolymers where the monomer A comprises a sodium or ammonium salt of styrenesulfonic acid and the monomer B is a salt of acrylic acid. A preferred polymer of such embodiments includes polymeric segments having Formula II and Formula IV, respectively:

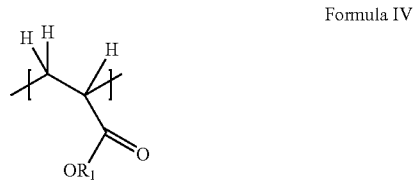

Formula IV wherein $R_1$ is a cation such as $Na^+$, $K^+$, $Li^+$, $NH_4^+$, or $R_5NH_3^+$.

In one preferred embodiment R1 is $Na^+$. In another embodiment of the present invention, a cellulosic fiber composition is provided comprising cellulose fiber and one or more of any of the above-described polymers. In some embodiments, the cellulose fiber comprises a pulp slurry, and in other embodiments, the cellulose fiber comprises paper or paperboard. The cellulosic fiber compositions are typically aqueous slurries, and thus, in those embodiments, the cellulosic fiber compositions further comprise water. Optionally, the cellulosic fiber composition may further comprise at least one of inorganic mineral extenders, pigments, sizing agents, starches, deposit control agents, fillers, opacifying agents, optical brighteners, strength agents, organic or inorganic coagulants, and conventional flocculants.

In another embodiment of the present invention, a method for preparing a cellulosic fiber composition is provided, the method comprising adding one or more of any of the above-described polymers to an aqueous cellulosic fiber slurry.

In another embodiment of the present invention, a method for improving drainage and retention of solids in a cellulosic fiber composition is provided, the method comprising adding one or more of any of the above-described polymers to the cellulosic fiber composition.

As used herein, the term "alkyl" includes both branched and straight-chain saturated aliphatic hydrocarbon groups having the specified number of carbon atoms, e.g. methyl (Me), ethyl (Et), propyl (Pr), isopropyl (i-Pr), isobutyl (i-Bu), secbutyl (s-Bu), tertbutyl (t-Bu), isopentyl, isohexyl and the like. When any of the foregoing substituents represents or contains an alkyl substituent group, this may be linear or branched and may contain up to 12 carbon atoms, preferably up to 6 carbon atoms, more preferably 1 or 2 carbon atoms.

The term "aryl" means an aromatic carbocyclic moiety of up to 20 carbon atoms, which may be a single ring (monocyclic) or multiple rings (polycyclic, up to three rings) fused together or linked covalently. Any suitable ring position of the aryl moiety may be covalently linked to the defined chemical structure. Examples of aryl moieties include, but are not limited to, chemical groups such as phenyl, 1-naphthyl, 2-naphthyl, dihydronaphthyl, tetrahydronaphthyl, biphenyl, pyrenyl, anthryl, phenanthryl, fluorenyl, indanyl, biphenylenyl, acenaphthenyl, acenaphthylenyl, and the like.

It is understood that the claims encompass all possible stereoisomers, tautomers, salts, and proforms. Moreover, unless stated otherwise, each alkyl and aryl is contemplated as being optionally substituted.

An optionally substituted moiety may be substituted with one or more substituents. The substituent groups which are optionally present may be one or more of those customarily employed. Specific examples of such substituents include halogen, nitro, cyano, thiocyanato, cyanato, hydroxyl, alkyl, haloalkyl, alkoxy, haloalkoxy, amino, alkylamino, dialkylamino, formyl, alkoxycarbonyl, carboxyl, alkanoyl, alkylthio, alkylsuphinyl, alkylsulphonyl, carbamoyl, alkylamido, phenyl, phenoxy, benzyl, benzyloxy, heterocyclyl or cycloalkyl groups, preferably halogen atoms or lower alkyl or lower alkoxy groups. Typically, 0-4 substituents may be present.

The polymers (both homopolymers and copolymers) of the present invention are preferably not branched or cross-linked polymers. For example, preferably no branching or cross-linking agents are utilized in the preparation.

The making of cellulosic fiber sheets, particularly paper and paperboard, includes producing an aqueous slurry of cellulosic fiber, which may also contain inorganic mineral extenders or pigments; depositing this slurry on a moving papermaking wire or fabric; and forming a sheet from the solid components of the slurry by draining the water. The present invention provides for a cellulosic fiber composition comprising cellulosic fiber and the polymers of the present invention. The present invention also provides for a method of making the cellulosic fiber composition comprising the step of adding the polymers of the present invention to a cellulosic slurry or cellulosic pulp slurry.

The polymers of the invention can be used in papermaking systems and processes, and particularly are useful as drainage and retention aids. As noted above, in commercial papermaking, a slurry of cellulosic fibers or pulp is deposited on a moving papermaking wire or fabric. The slurry may contain other chemicals, such as sizing agents, starches, deposit control agents, mineral extenders, pigments, fillers, opacifying agents, optical brighteners, organic or inorganic coagulants, conventional flocculants, or other common additives to paper pulp. As water from the deposited slurry is removed, a sheet forms. Ordinarily, the sheets are then pressed and dried to form paper or paper board. The polymers of the invention are preferably added to the slurry before it reaches the wire to improve the drainage or dewatering and the retention of the fiber fines and fillers in the slurry.

Suitable cellulosic fiber pulps that may be employed in for the methods of the invention include conventional papermaking stock such as traditional chemical pulp. For instance, bleached and unbleached sulfate pulp and sulfite pulp, mechanical pulp such as groundwood, thermomechanical pulp, chemi-thermomechanical pulp, recycled pulp such as old corrugated containers, newsprint, office waste, magazine paper and other non-deinked waste, deinked waste, and mixtures thereof, may be used.

The presently described polymer is typically diluted at the application site to produce an aqueous solution of about 0.01 to about 1% active polymer and then added to the paper process to affect retention and drainage. The presently described polymer may be added to the thick stock or thin stock, preferably the thin stock. The polymer may be added at one feed point, or may be split fed such that the polymer is fed simultaneously to two or more separate feed points. Typical stock addition points include feed point(s) before the fan pump, after the fan pump and before the pressure screen, or after the pressure screen.

The presently described polymer is preferably employed in a proportion of from about 0.01 lb. to about 10 lbs. of active polymer per ton of cellulosic pulp, based on the dry weight of the pulp. The concentration of polymer is more preferably from about 0.05 lb. to about 5 lbs. of active polymer per ton of dried cellulosic pulp.

Polymerization of the water-soluble or water-dispersible anionic, high molecular weight, aromatic sulfonated polymers may be carried out in any manner known to those skilled in the art, for example see Allcock and Lampe, *Contemporary Polymer Chemistry*, (Englewood Cliffs, N.J., PRENTICE-HALL, 1981), chapters 3-5. The polymers may be produced via inverse emulsion polymerization, solution polymerization, suspension polymerization, precipitation polymerization, etc. The polymers may be also produced via sulfonation of a polystyrene parent, where a water-insoluble, nonionic polystyrene polymer is sulfonated to a polystyrene sulfonate. Examples of these reactions include the use of a number of sulfonating reagents, including but not limited to sulfur trioxide ($SO_3$), sulfur trioxide with tri-ethyl phosphate, acetyl sulfate (produced in-situ by mixing concentrated sulfuric acid with acetic anhydride), chlorosulfonic acid, and the like.

Any of the chain transfer agents known to those skilled in the art may also be used to control the molecular weight. Those include, but are not limited to, lower alkyl alcohols such as isopropanol, amines, mercaptans such as mercaptoethanol, phosphites, thioacids, allyl alcohol, and the like. It is to be understood that the aforementioned polymerization methods do not in any way limit the synthesis of polymers according to the invention.

In another embodiment, a method for making the above-described polymers is described in copending U.S. patent application Ser. No. 11/012,010, filed Dec. 14, 2004, the entire disclosure of which is incorporated herein by reference.

The present compounds are further described in the following examples.

EXAMPLES

Example 1

To a suitable reaction flask equipped with an overhead mechanical stirrer, thermometer, nitrogen sparge tube, and condenser was charged an oil phase of paraffin oil (139.0 g, ESCAID® 110 oil, ExxonMobil—Houston, Tex.) and surfactants (3.75 g CIRRASOL® G-1086 and 11.25 g SPAN® 80, both from Uniqema—New Castle, Del.).

An aqueous phase was prepared separately which comprised 50 wt % acrylamide solution in water (51.1 g, 50 molar % based on total monomer), styrene sulfonic acid, sodium salt powder (74.44 g, 50 molar % based on total monomer), deionized water (218.47 g), and VERSENEX® 80 (Dow Chemical, Midland, Mich.) chelant solution (0.27 g). The aqueous phase was warmed to about 35-45° C. to dissolve the monomers. The pH of the aqueous solution ranges from 9-11.

The aqueous phase was then charged to the oil phase while simultaneously mixing with a homogenizer to obtain a stable water-in-oil emulsion. This emulsion is then mixed with a 4-blade glass stirrer while being sparged with nitrogen for 60 minutes. During the nitrogen sparge the temperature of the emulsion was adjusted to 57±1° C. Afterwards, the sparge was discontinued and a nitrogen blanket implemented.

The polymerization was initiated by feeding a 3 wt. % AIBN solution in toluene corresponding to an initial AIBN charge of 75 ppm on a total monomer molar basis. Four hours after the initial AIBN charge, a 3 wt. % AIBN solution in toluene corresponding to a second AIBN charge of 75 ppm on a total molar monomer basis, was charged into the reactor over ~30 seconds. Then the batch was held at 57±1° C. for 1.5 hours. The final AIBN charge, a 3 wt. % AIBN solution in toluene corresponding to a final AIBN charge of 100 ppm on a total molar monomer basis, was charged into the reactor over ~30 seconds and heated to 65±1° C. and held over about 0.5 hours. The batch was then cooled to room temperature and the product collected.

Optionally, a breaker surfactant is added to the polymeric inverse emulsion to enhance the inversion of the emulsion when added to water.

Examples 2-7

The preparation of polymer was conducted according to the method of Example 1, except for changes provided in Table 1.

TABLE 1

| Example | Molar Composition | $M_w$, g/mole ($10^6$) |
| --- | --- | --- |
| 1 | 50% NaSS/50% AM | 10 |
| 2 | 30% NaSS/70% AM | 8.7 |
| 3 | 50% NaSS/50% AM | 25.9 |
| 4 | 70% NaSS/30% AM | 10 |
| 5 | 70% NaSS/30% AM | 11.8 |
| 6 | 100% NaSS | 7.0 |
| 7 | 100% NaSS | 5.4 |

The weight average molecular weight $M_w$ was determined by batch multi-angle laser light scattering (MALLS) using a Dawn DSP Laser Photometer Optilab DSP Interferometric Refractometer system (Wyatt Technology, Santa Barbara, Calif.). In MALLS batch mode, several concentrations of polymer solution in 1 M $NaNO_3$ were analyzed in order to extrapolate light scattering and refractive index data to very low scattering angles and concentrations. Zimm plots were then constructed, utilizing the light scattering data from several polymer concentrations and detection angles, to obtain the weight average molecular weight $M_w$.

The method for determining the absolute weight average molecular weight $M_w$ is light scattering. While size exclusion chromatography (SEC) or gel permeation chromatography (GPC) can also provide a weight average molecular weight $M_w$, this is a relative determination of the $M_w$ based upon comparison of the tested polymer with polymer molecular weight standards. Light scattering is the sole method disclosed herein for determining weight average molecular weight $M_w$.

The weight average molecular weight $M_w$ was determined as above for a number of comparative polymers as well, listed in Table 2.

TABLE 2

| Polymer | Molar Composition | $M_w$, g/mole ($10^6$) |
| --- | --- | --- |
| VERSA ® TL-501 | 100% NaSS | 1.7 |
| SP2 - #625 | 100% NaSS | 0.26* |
| SP2 - #626 | 100% NaSS | 0.51* |
| EM 1030 Na | 100% NaAc | 6.4 |
| AN 132 | 32% AMPS/68% AM | 3.7 |
| EM 1010 | 100% AMPS | 9.4 |

*supplier reported $M_w$ determined from light scattering.

Abbreviations

VERSA® TL-501 is a poly(styrenesulfonate, sodium salt), commercially available from Alco Chemicals (Chattanooga, Tenn.) as an aqueous solution SP2 product numbers 625 and 626 are poly(styrene-sulfonate, sodium salt) molecular weight standards, available from Scientific Polymer Products (Ontario, N.Y.) as dry powders EM 1030 Na is a poly(sodium acrylate), commercially available from SNF Floerger (Riceboro, Ga.) as a self inverting, inverse emulsion AN 132 is a 32:68 mole % poly(acrylamide-co-2-acrylamido-2-methyl-propanesulfonic acid, sodium salt) available from SNF Floerger as a dry powder EM 1010 is a poly(2-acrylamido-2-methyl-propane-sulfonic acid, sodium salt) available from SNF Floerger as a self inverting, inverse emulsion NaSS—sodium styrenesulfonate AM—acrylamide NaAc—sodium acrylate AMPS—2-acrylamido-2-methyl-propanesulfonic acid, sodium salt $M_w$—weight average molecular weight determined by multi-angle laser light scattering (MALLS)

The techniques of paper sheet formation and retention chemistry are well known in the art. For example see *Handbook for Pulp and Paper Technologist*, ed. G. A. Smook, (Atlanta Ga., TAPPI Press, 1989), and *PULP AND PAPER, Chemistry and Chemical Technology*, $3^{rd}$ edition, ed. J. P. Casey, (New York, Wiley-Interscience, 1981). To evaluate the performance of the examples of the present invention, a series of drainage experiments were conducted utilizing the Dynamic Drainage Analyzer (DDA). The presently described and comparative polymers were compared to NP 780 (Eka Chemicals, Marietta, Ga.), an inorganic silica drainage aid commonly referred to within the industry as a "microparticle." Unless otherwise stated, all percentages, parts, etc., are by weight.

The DDA (AB Akribi Kemikonsulter, Sundsvall, Sweden) is known in the art. The unit consists of a baffled mixing jar, a vacuum vessel, and a control box equipped with electronic and pneumatic controls. The DDA will measure the drainage time, retention, and wet sheet permeability of a pulp furnish. In the operation of the DDA, a pulp slurry is added to the mixing chamber. Upon starting the test, a mechanical agitator will begin mixing at a specified speed. The various additives are added into the mixing chamber at specified interval times. Upon completion of mixing, a 300 mbar vacuum is applied to the reservoir under the mixing chamber, draining the slurry, and collecting the filtrate in the vacuum vessel. The furnish will continue to drain until the vacuum breaks through the furnish, and a wet mat is formed, analogous to a wet line on a paper machine. The vacuum will then continue to operate to a specified time after the mat is formed. The DDA drainage time is assigned as the time to vacuum break-through, where the vacuum decreases from the applied 300 mbar level. The sheet permeability is the equilibrium vacuum of the wet mat at the end of the test. A lower drainage time in seconds is a more desired response, as the pulp will more readily dewater. A higher sheet permeability is desired, as this is an indication of the degree of flocculation of the formed wet mat. A low permeability indicates an undesirable high degree of flocculation, resulting in large flocs that would not easily release interstitial water. This type of floc would not easily dewater on a paper machine in the press and drying sections. A low permeability could also result in poor printability and coatability of the resultant formed sheet. In comparing different systems, a lower drainage time in combination with a higher sheet permeability is the desired response.

The furnish employed in this series of tests was a synthetic, acid pH, mechanical furnish. This furnish is prepared from coated and uncoated broke obtained from a southern US paper-mill. The coated and uncoated broke paper are dispersed into water utilizing a TAPPI disintegrator (Testing Machines Inc., Amityville, N.Y.). The water utilized in preparing the furnish comprises a mixture of 3 parts deionized water to 1 part local hard water, further modified with 0.075% sodium sulfate and 0.0025% Slendid® 100 pectin gum (CP Kelco, Atlanta, Ga.). The furnish pH is adjusted to 4.5.

The DDA drainage tests are conducted with 500 mls of the synthetic furnish, having a total solids concentration of 0.5%. The test is conducted at 1,600 rpm with the sequential addition of a cationic starch, followed by a cationic coagulant, followed by polymer flocculant, followed by drainage aid; the materials are all mixed at specified interval times. After the drainage aid has been introduced and mixed, the drainage test is conducted. The cationic starch is added at a level of 10 lbs. starch per ton of dry furnish. The cationic coagulant is added at a level of 1 lb. active coagulant per ton of dry furnish. The polymer flocculant is added at a level of 0.5 lbs. active flocculant per ton of dry furnish. The dosages of the drainage aids are as pounds (lbs) active drainage aid per ton of dry furnish, with the specific dosages noted in the data tables.

In DDA drainage tests, the cationic starch utilized is STA-LOK® 400 potato starch (A. E. Staley, Decatur, Ill.). The cationic coagulant is a branched epichlorohydrin-dimethylamine condensation polymer, sold under the trademark PERFORM® PC 1279 (Hercules, Wilmington, Del.). The cationic flocculant utilized is a 90/10 mole % acrylamide/acryloyloxyethyltrimethylammonium chloride, sold under the trademark PERFORM® PC 8715 (Hercules, Wilmington, Del.), available commercially as a dry powder. The results of the DDA drainage tests are set forth in Table 3 below.

TABLE 3

| RUN # | Description | Drainage Aid/ Polymer | #/T (active) | Drain Time (s) | Sheet Permeability (mbar) |
|---|---|---|---|---|---|
| 3-1 | — | none | 0 | 22.5 | 228 |
| 3-2 | Standard | NP 780 | 0.5 | 21.1 | 230 |
| 3-3 | Standard | NP 780 | 1 | 19.1 | 232 |
| 3-4 | Standard | NP 780 | 1.5 | 18.1 | 237 |
| 3-5 | Example 2 | 33618-52 | 0.3 | 24.6 | 232 |

TABLE 3-continued

| RUN # | Description | Drainage Aid/ Polymer | #/T (active) | Drain Time (s) | Sheet Permeability (mbar) |
|---|---|---|---|---|---|
| 3-6 | Example 2 | 33618-52 | 0.6 | 22.9 | 230 |
| 3-7 | Example 2 | 33618-52 | 0.9 | 21.4 | 229 |
| 3-8 | Example 1 | 33651-7 | 0.3 | 22.9 | 232 |
| 3-9 | Example 1 | 33651-7 | 0.6 | 19.9 | 229 |
| 3-10 | Example 1 | 33651-7 | 0.9 | 17.7 | 229 |
| 3-11 | Example 4 | 33651-37 | 0.3 | 22.1 | 230 |
| 3-12 | Example 4 | 33651-37 | 0.6 | 18.7 | 227 |
| 3-13 | Example 4 | 33651-37 | 0.9 | 15.5 | 222 |
| 3-14 | Example 6 | 33632-10 | 0.3 | 20.5 | 233 |
| 3-15 | Example 6 | 33632-10 | 0.6 | 17.6 | 236 |
| 3-16 | Example 6 | 33632-10 | 0.9 | 15.9 | 243 |
| 3-17 | Comparative | EM 1030 Na | 0.3 | 24.7 | 237 |
| 3-18 | Comparative | EM 1030 Na | 0.6 | 23.6 | 242 |
| 3-19 | Comparative | EM 1030 Na | 0.9 | 23.0 | 248 |
| 3-20 | Comparative | AN 132 | 0.3 | 24.4 | 230 |
| 3-21 | Comparative | AN 132 | 0.6 | 24.8 | 237 |
| 3-22 | Comparative | AN 132 | 0.9 | 24 | 245 |
| 3-23 | Comparative | EM 1010 | 0.3 | 23.6 | 237 |
| 3-24 | Comparative | EM 1010 | 0.6 | 21.6 | 243 |
| 3-25 | Comparative | EM 1010 | 0.9 | 20.7 | 251 |

The data set forth in Table 3 illustrate the drainage activity of the anionic, aromatic sulfonated polymers of the present invention compared to the results obtained with carboxylated and aliphatic sulfonated polymers. The polymers in runs 8 through 16 with the 50%, 70% and 100% NaSS polymers improve drainage time compared to cationic flocculant alone, with no affect on the sheet permeability.

The EM 1030 Na, EM 1010 and AN 132 did not improve drainage over the control program of the cationic flocculant only.

Contrary to expectations, the data herein demonstrate that the high molecular weight, anionic, aromatic, sulfonated polymers of the present invention are vastly superior to affect retention and drainage, as the aliphatic sulfonated polymers and carboxylated polymers do not provide any drainage improvement compared to the untreated control.

A second series of drainage tests with the synthetic, acid pH, mechanical furnish were conducted utilizing the DDA.

TABLE 4

| RUN # | Description | Drainage Aid | #/T (active) | Drain Time (s) | Sheet Permeability (mbar) |
|---|---|---|---|---|---|
| 4-1 | — | none | 0 | 24.1 | 237 |
| 4-2 | Standard | NP 780 | 0.5 | 23.2 | 237 |
| 4-3 | Standard | NP 780 | 1 | 20.2 | 237 |
| 4-4 | Standard | NP 780 | 1.5 | 18.5 | 236 |
| 4-5 | Comparative | SP2 - #625 | 0.3 | 23.8 | 240 |
| 4-6 | Comparative | SP2 - #625 | 0.6 | 21.3 | 248 |
| 4-7 | Comparative | SP2 - #625 | 0.9 | 20.8 | 257 |
| 4-8 | Comparative | SP2 - #626 | 0.3 | 23.3 | 241 |
| 4-9 | Comparative | SP2 - #626 | 0.6 | 20.6 | 249 |
| 4-10 | Comparative | SP2 - #626 | 0.9 | 20.1 | 256 |
| 4-11 | 7 | 33562-88 | 0.3 | 23.0 | 240 |
| 4-12 | 7 | 33562-88 | 0.6 | 19.6 | 241 |
| 4-13 | 7 | 33562-88 | 0.9 | 17.1 | 242 |
| 4-14 | 4 | 33651-37 | 0.3 | 23.4 | 240 |
| 4-15 | 4 | 33651-37 | 0.6 | 19.3 | 233 |
| 4-16 | 4 | 33651-37 | 0.9 | 16.4 | 231 |

The data in Table 4 demonstrate that the polymers of $M_W$ greater than 5 million provided good drainage activity, exceeding that provided by the NP 780 at lower product dosages. The PSS homopolymers possessing $M_W$ of 220,000 and 510,000 provided minimal drainage activity compared to the presently described polymers with $M_W$ greater than 5 million, and demonstrate the requirement for $M_W$ greater than 5 million to affect the drainage performance. This result is unexpected.

A series of drainage tests were also conducted utilizing a vacuum drainage test (VDT) with a synthetic, acid pH, wood-free furnish; the data are shown in Table 4. The device setup is similar to the Buchner funnel test as described in various filtration reference books, for example see *Perry's Chemical Engineers' Handbook*, $7^{th}$ edition, (McGraw-Hill, New York, 1999) pp. 18-78. The VDT consists of a 300-ml magnetic Gelman filter funnel, a 250-ml graduated cylinder, a quick disconnect, a water trap, and a vacuum pump with a vacuum gauge and regulator. The VDT test is conducted by first setting the vacuum to the desired level, typically 10 inches Hg, and placing the funnel properly on the cylinder. Next, 250 g of 0.5 wt. % paper stock is charged into a beaker and then the required additives according to treatment program (e.g., starch, alum, and testing flocculants) are added to the stock under the agitation provided by an overhead mixer. The stock is then poured into the filter funnel and the vacuum pump is turned on while simultaneously starting a stopwatch. The drainage efficacy is reported as the time required to obtain 230 ml of filtrate. The principle of the VDT is based on the cake filtration theory, for reference see *Solid-Liquid Separation*, $3^{rd}$ edition, ed. L. Svarovsky, (London, Butterworths, 1990) chapter 9. Initially, the solids in the slurry are deposited on a thin filter medium that serves to support the filter cake. The successive deposit of solids layer to form the filter cake, or mat, is dependent on floc density, floc size distribution in the mat, and levels of residual polymeric materials in the aqueous phase. A flocculant that forms dense and uniform-sized flocs and has low residual level in water (i.e., good formation characteristics) will demonstrate good drainage in the VDT test, and vice versa.

The synthetic wood-free acid furnish is prepared from hardwood and softwood dried market lap pulps, and from water and other materials. First the hardwood and softwood dried market lap pulp are separately refined in a laboratory Valley Beater (Voith, Appleton, Wis.). These pulps are then added to an aqueous medium.

The water utilized in preparing the furnish comprises a mixture of 3 parts deionized water to 1 part local hard water, further modified with 0.075% sodium sulfate and 0.0025% Slendid® 100 pectin gum (CP Kelco, Atlanta, Ga.). The furnish pH is adjusted to 4.5.

To prepare the furnish, the hardwood and softwood are dispersed into the aqueous medium at a 70:30 weight ratio of hardwood:softwood. Clay filler is introduced into the furnish at 25 weight percent, based on the combined dry weight of the pulps, so as to provide a final furnish comprising 80% fiber and 20% clay filler. The pH of the furnish is adjusted to 4.5. The starch, coagulant, and flocculant additives, dosages, and addition sequence are as utilized in the above examples.

TABLE 5

| RUN # | Description | Drainage Aid/ Polymer | #/T (active) | Drain Time (s) |
|---|---|---|---|---|
| 5-1 | — | none | 0 | 31.4 |
| 5-2 | Standard | NP 780 | 0.3 | 19.0 |
| 5-3 | Standard | NP 780 | 0.6 | 17.4 |
| 5-4 | Standard | NP 780 | 0.9 | 17.5 |
| 5-5 | Comparative | EM 1030 Na | 0.3 | 21.5 |
| 5-6 | Comparative | EM 1030 Na | 0.6 | 21.8 |

TABLE 5-continued

| RUN # | Description | Drainage Aid/ Polymer | #/T (active) | Drain Time (s) |
|---|---|---|---|---|
| 5-7 | Comparative | EM 1030 Na | 0.9 | 23.1 |
| 5-8 | Example 4 | 33651-37 | 0.3 | 22.1 |
| 5-9 | Example 4 | 33651-37 | 0.6 | 19.9 |
| 5-10 | Example 4 | 33651-37 | 0.9 | 18.0 |
| 5-11 | Example 6 | 33632-10 | 0.3 | 20.9 |
| 5-12 | Example 6 | 33632-10 | 0.6 | 19.7 |
| 5-13 | Example 6 | 33632-10 | 0.9 | 19.5 |
| 5-14 | Comparative | EM 1010 | 0.3 | 29.8 |
| 5-15 | Comparative | EM 1010 | 0.6 | 28.7 |
| 5-16 | Comparative | EM 1010 | 0.9 | 29.9 |
| 5-17 | Comparative | SP2 - #625 | 0.3 | 22.0 |
| 5-18 | Comparative | SP2 - #625 | 0.6 | 23.2 |
| 5-19 | Comparative | SP2 - #625 | 0.9 | 25.0 |
| 5-20 | Comparative | SP2 - #626 | 0.3 | 20.9 |
| 5-21 | Comparative | SP2 - #626 | 0.6 | 22.8 |
| 5-22 | Comparative | SP2 - #626 | 0.9 | 22.9 |

The data in Table 5 demonstrate the good activity of the presently described polymers compared to, EM 1010 which does not affect the drainage, and the lower $M_W$-PSS polymers, which do not further increase in drainage as the dosage increases. The lower $M_W$-PSS polymers provide slower drainage as the dosage is increased, an undesired response. The presently described polymers possessing $M_W$ greater than 5 million demonstrate remarkably better drainage than the aliphatic sulfonated polymer EM 1010 and the low $M_W$ PSS homopolymers. This result is unexpected.

Another series of DDA drainage experiments were conducted with the presently described polymers utilizing furnish from a southern US papermill producing lightweight coated grades. The mill was running a program of NP 780 silica in combination with cationic coagulant and cationic flocculent. The furnish was prepared by blending mill machine chest stock and white water to a representative consistency. For the DDA test, the furnish was treated with a cationic coagulant at a level of 1 lb. active coagulant per ton of dry furnish, a polymer flocculent at a level of 0.5 lbs. active flocculent per ton of dry furnish, and the drainage aids are as lbs. active drainage aid per ton of dry furnish, with the specific dosages noted in the data table. The cationic coagulant is PERFORM® PC 1279, and the cationic flocculant utilized is PERFORM® PC 8715 flocculant.

TABLE 6

| RUN # | Description | Drainage Aid/ Polymer | #/T (active) | Drain Time (s) | Sheet Permeability (mbar) |
|---|---|---|---|---|---|
| 6-1 | — | none | 0 | 32.6 | 249 |
| 6-2 | Standard | NP 780 | 0.25 | 24.6 | 236 |
| 6-3 | Standard | NP 780 | 0.5 | 25.0 | 240 |
| 6-4 | Standard | NP 780 | 1 | 24.0 | 237 |
| 6-5 | Comparative | EM 1030 Na | 0.25 | 30.2 | 242 |
| 6-6 | Comparative | EM 1030 Na | 0.5 | 31.5 | 246 |
| 6-7 | Example 3 | 33562-30 | 0.25 | 24.7 | 235 |
| 6-8 | Example 3 | 33562-30 | 0.5 | 20.7 | 232 |
| 6-9 | Comparative | VERSA ® TL-501 | 0.25 | 25.3 | 242 |
| 6-10 | Comparative | VERSA ® TL-501 | 0.5 | 25.0 | 247 |

Another series of DDA drainage experiments were conducted with the presently described polymers utilizing furnish from a southern US papermill producing newsprint. The mill was running a program of NP 780 silica in combination with alum and cationic flocculant. The furnish was prepared by blending mill machine chest stock and white water to a representative consistency. For the DDA test, the furnish was treated with aluminum sulfate octahecahydrate at a level of 4 lb. alum per ton of dry furnish, a polymer flocculant at a level of 0.25 lbs. active flocculant per ton of dry furnish, and the drainage aids are as lbs. active drainage aid per ton of dry furnish, with the specific dosages noted in the data table. The cationic flocculant utilized is PERFORM® PC 8715 flocculant.

TABLE 7

| RUN # | Description | Drainage Aid | #/T (active) | Drain Time (s) | Sheet Permeability (mbar) |
|---|---|---|---|---|---|
| 7-1 | — | none | 0 | 36.8 | 262 |
| 7-2 | Standard | NP 780 | 0.25 | 28.5 | 260 |
| 7-3 | Standard | NP 780 | 0.5 | 27.6 | 260 |
| 7-4 | Standard | NP 780 | 0.75 | 27.1 | 264 |
| 7-5 | Standard | NP 780 | 1 | 28 | 264 |
| 7-6 | Comparative | EM 1030 Na | 0.25 | 36.3 | 261 |
| 7-7 | Comparative | EM 1030 Na | 0.5 | 36.3 | 262 |
| 7-8 | Example 5 | 33618-18 | 0.25 | 27.8 | 261 |
| 7-9 | Example 5 | 33618-18 | 0.5 | 25.3 | 255 |
| 7-10 | Example 5 | 33618-18 | 1 | 24.6 | 247 |
| 7-11 | Comparative | VERSA® TL-501 | 0.25 | 31.8 | 278 |
| 7-12 | Comparative | VERSA® TL-501 | 0.5 | 33.2 | 282 |

The data in Tables 6 and 7 illustrate the good drainage of the presently described polymers in actual mill furnish, exceeding the drainage provided by NP 780, EM 1030 Na, and a low $M_w$ PSS homopolymer Versa® TL-501. The presently described polymers possessing Mw greater than 5 million demonstrate remarkably better drainage than the low Mw PSS homopolymer. This result is unexpected.

Another series of VDT drainage experiments were conducted utilizing a synthetic alkaline furnish; the data are shown in Table 8. The synthetic alkaline furnish is prepared from hardwood and softwood dried market lap pulps, and from water and other materials. First the hardwood and softwood dried market lap pulp are separately refined in a laboratory Valley Beater (Voith, Appleton, Wis.). These pulps are then added to an aqueous medium.

The water utilized in preparing the furnish comprises a mixture of 3 parts deionized water to 1 part local hard water, further modified with 0.01% sodium bicarbonate and 0.03% sodium chloride.

To prepare the furnish, the hardwood and softwood are dispersed into the aqueous medium at 70;30 weight ratio of hardwood:softwood. Precipitated calcium carbonate (PCC) filler is introduced into the furnish at 25 weight percent, based on the combined dry weight of the pulps, so as to provide a final furnish comprising 80% fiber and 20% PCC filler. The resultant pH is 8.3.

The VDT test was conducted at 1,200 rpm with the sequential addition of a cationic starch, followed by alum, followed by polymer flocculant, followed by drainage aid; the materials are all mixed at specified interval times. After the drainage aid has been introduced and mixed, the drainage test is conducted. The cationic starch is added at a level of 10 lbs. starch per ton of dry furnish. The alum (aluminum sulfate octadecahydrate) is added at a level of 5 lb. alum per ton of dry furnish. The polymer flocculant is added at a level of 0.4 lbs. active flocculant per ton of dry furnish. The dosages of the drainage aids are as lbs. active drainage aid per ton of dry furnish, with the specific dosages noted in the data tables.

The cationic starch and alum are as described in other data tables. The cationic flocculant utilized is a 90/10 mole % acrylamide/acryloyloxyethyltrimethylammonium chloride, sold under the trademark PERFORM® PC 8138 (Hercules, Wilmington, Del.), available commercially as a self-inverting emulsion. PERFORM® SP 9232 drainage aid (Hercules, Wilmington, Del.) is a drainage aid, available commercially as a self-inverting emulsion.

TABLE 8

| RUN # | Description | Drainage Aid | #/T (active) | Drain Time (s) |
|---|---|---|---|---|
| 8-1 | — | none | 0 | 33.8 |
| 8-2 | Comparative | PERFORM® SP 9232 | 0.2 | 28.4 |
| 8-3 | Comparative | PERFORM® SP 9232 | 0.4 | 23.8 |
| 8-4 | Comparative | PERFORM® SP 9232 | 0.8 | 18.1 |
| 8-5 | Example 4 | 33651-37 | 0.2 | 24.2 |
| 8-6 | Example 4 | 33651-37 | 0.4 | 20.6 |
| 8-7 | Example 4 | 33651-37 | 0.8 | 17.1 |
| 8-8 | Example 1 | 33651-7 | 0.2 | 25.0 |
| 8-9 | Example 1 | 33651-7 | 0.4 | 22.5 |
| 8-10 | Example 1 | 33651-7 | 0.8 | 19.3 |
| 8-11 | Example 6 | 33632-10 | 0.2 | 22.5 |
| 8-12 | Example 6 | 33632-10 | 0.4 | 19.8 |
| 8-13 | Example 6 | 33632-10 | 0.8 | 18.1 |

The drainage data in Table 8 demonstrate the comparable activity of the presently described polymers compared to a commercial drainage aid in an alkaline furnish.

The disclosures of each patent, patent application, and publication cited or described in this document are hereby incorporated herein by reference, in their entireties.

Various modifications of the invention, in addition to those described herein, will be apparent to those skilled in the art from the foregoing description. Such modifications are also intended to fall within the scope of the appended claims.

We claim:

1. A cellulosic fiber composition comprising:
cellulose fiber and a water-compatible polymer comprising a polymer segment formed from at least one ethylenically unsaturated monomer (A) substituted with at least one aryl group and at least one —S(=O)$_2$OR$_1$ or —OS(=O)$_2$(O)$_p$R$_1$ moiety, wherein p is 0 or 1, R$_1$ is, independently at each occurrence, H, alkyl, aryl, or a cation, and the polymer has a weight average molecular weight of greater than 5 million.

2. The cellulosic fiber composition of claim 1, wherein the monomer A is selected from the group consisting of the free acid or salt of: styrenesulfonic acid, vinyltoluenesulfonic acid, α-methyl styrenesulfonic acid, anetholesulfonic acid, vinyl phenyl sulfuric acid, 4-sulfonate N-benzyl acrylamide, 4-sulfonate N-phenyl acrylamide, vinylpyrenesulfonic acid, vinylanthracenesulfonic acid, vinylpyridiniopropane sulfonate, and mixtures thereof.

3. The cellulosic fiber composition of claim 1, wherein die monomer A comprises a free acid or salt of styrenesulfonic acid.

4. The cellulosic fiber composition of claim 1, wherein the monomer A has Formula I:

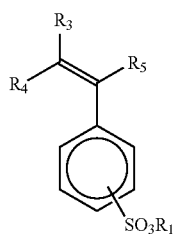

wherein:
$R_1$ is $Na^+$, $K^+$, $Li^+$, $NH_4^+$ or $R_5NH_3^+$; and
$R_3$, $R_4$, and $R_5$ are, independently, H or alkyl, and
the —$SO_3R_1$ group is in the ortho, meta or pan position.

5. The cellulosic fiber composition of claim 1, wherein the monomer A has Formula IA or IB:

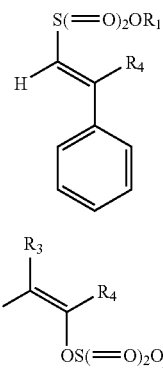

wherein:
$R_1$ is a cation
$R_3$, $R_4$, and $R_5$ are, independently, H or alkyl; and
Ar is aryl.

6. The cellulosic fiber composition of claim 1, further comprising a polymer segment formed from at least one ethylenically unsaturated anionic or nonionic monomer (B).

7. The cellulosic fiber composition of claim 3, further comprising a polymer segment formed from at least one ethylenically unsaturated anionic or nonionic monomer (B).

8. The cellulosic fiber composition of claim 6, wherein the monomer B is selected from the group consisting of, acrylamide, methacrylamide, N-alkylacrylamide, N-methylacrylamide, N,N-dialkyl acrylamide, N,N-dimethylacrylamide, acrylonitrile, N-vinyl methylacetamide, N-vinyl formamide, N-vinyl methyl formamide, N-vinyl pyrrolidone, styrene, butadiene, vinyl acetate, methyl acrylate, methyl methacrylate, alkyl acrylate, alkyl methacrylate, alkyl acrylamide, alkyl methacrylamide, alkoxylated acrylate, methacrylate, alkyl polyethyleneglycol acrylate, alkyl polyethyleneglycol methacrylate, the free acid or salt of: (meth) acrylic acid, maleic acid, fumaric acid, itaconic acid, acrylamidoglycolic acid, and mixtures thereof.

9. The cellulosic fiber composition of claim 6, wherein the monomer B is acrylamide.

10. The cellulosic fiber composition of claim 6, wherein the monomer B is a salt of acrylic acid.

11. The cellulosic fiber composition of claim 9, wherein the monomer A comprises a sodium or ammonium salt of styrenesulfonic acid.

12. The cellulosic fiber composition of claim 10, wherein the monomer A comprises a sodium or ammonium salt of styrenesulfonic acid.

13. The cellulosic fiber composition of claim 6, wherein the molar ratio of A:B is from about 5:95 to about 100:0.

14. The cellulosic fiber composition of claim 6, wherein the molar ratio of A:B is from about 20:80 to about 100:0.

15. The cellulosic fiber composition of claim 6, wherein the molar ratio of A:B is from about 30:70 to about 100:0.

16. The cellulosic fiber composition of claim 1, wherein the cellulose fiber comprises a pulp slurry.

17. The cellulosic fiber composition of claim 1, wherein the cellulose fiber comprises paper or paperboard.

18. The cellulosic fiber composition of claim 1, further comprising a least one of inorganic mineral extenders, pigments, sizing agents, starches, deposit control agents, fillers, opacifying agents, optical brighteners, strength agents, organic or inorganic coagulants, and conventional flocculants.

19. A method for preparing a cellulosic fiber composition, comprising:
adding to an aqueous cellulosic fiber slimy an anionic water-compatible polymer comprising a polymer segment formed from at least one ethylenically unsaturated monomer (A) substituted with at least one atyl group and at least one —$S(=O)_2OR_1$ or —$OS(=O)_2(O)_pR_1$ moiety, wherein p is 0 or 1, $R_1$ is, independently at each occurrence, H, alkyl, aryl, or a cation, and the polymer has a weight average molecular weight of greater than 5 million.

20. A method for improving drainage and retention of solids in a cellulosic fiber composition, comprising:
adding to the cellulosic fiber composition an anionic water-compatible polymer comprising a polymer segment formed from at least one ethylenically unsaturated monomer (A) substituted with at least one aryl group and at least one —$S(=O)_2OR_1$ or —$OS(=O)_2(O)_pR_1$ moiety, wherein p is 0 or 1, $R_1$ is, independently at each occurrence, H, alkyl, aryl, or a cation, and the polymer has a weight average molecular weight of greater than 5 million.

* * * * *